(12) United States Patent
Akl et al.

(10) Patent No.: US 11,888,742 B2
(45) Date of Patent: Jan. 30, 2024

(54) EXTENDED ROUTING IDENTIFIERS FOR INTEGRATED ACCESS AND BACKHAUL

(71) Applicant: QUALCOMM Incorporated, San Diego, CA (US)

(72) Inventors: Naeem Akl, Somerville, NJ (US); Karl Georg Hampel, Hoboken, NJ (US); Sony Akkarakaran, Poway, CA (US); Navid Abedini, Basking Ridge, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 17/452,001

(22) Filed: Oct. 22, 2021

(65) Prior Publication Data
US 2023/0130693 A1    Apr. 27, 2023

(51) Int. Cl.
*H04W 40/02* (2009.01)
*H04L 45/745* (2022.01)
*H04L 69/22* (2022.01)

(52) U.S. Cl.
CPC ............ *H04L 45/745* (2013.01); *H04L 69/22* (2013.01); *H04W 40/02* (2013.01)

(58) Field of Classification Search
CPC ....... H04W 40/02; H04L 45/745; H04L 69/22
See application file for complete search history.

(56) References Cited

U.S. PATENT DOCUMENTS

| | | | |
|---|---|---|---|
| 2021/0051512 A1 | 2/2021 | Hampel et al. | |
| 2021/0058826 A1* | 2/2021 | Mao | H04W 28/088 |
| 2021/0127296 A1 | 4/2021 | Akl et al. | |
| 2021/0127319 A1* | 4/2021 | Huang | H04W 40/02 |
| 2021/0168646 A1* | 6/2021 | Chen | H04W 28/0263 |
| 2021/0266783 A1* | 8/2021 | Zhu | H04W 72/1268 |
| 2021/0306929 A1* | 9/2021 | Koskinen | H04W 40/02 |
| 2022/0174579 A1* | 6/2022 | Zhuo | H04W 40/02 |
| 2022/0279552 A1* | 9/2022 | Teyeb | H04W 40/22 |
| 2022/0312529 A1* | 9/2022 | Vangala | H04W 76/19 |
| 2023/0007565 A1* | 1/2023 | Mildh | H04W 40/22 |
| 2023/0156837 A1* | 5/2023 | Hwang | H04W 40/22 370/329 |
| 2023/0171745 A1* | 6/2023 | Ghanbarinejad | H04W 76/19 370/329 |

FOREIGN PATENT DOCUMENTS

EP    3890267 A1    10/2021

OTHER PUBLICATIONS

International Search Report and Written Opinion—PCT/US2022/076481—ISA/EPO—dated Dec. 7, 2022.

* cited by examiner

*Primary Examiner* — Kent Krueger
(74) *Attorney, Agent, or Firm* — Harrity & Harrity, LLP

(57) ABSTRACT

Various aspects of the present disclosure generally relate to wireless communication. In some aspects, a wireless node may receive a configuration for including extended routing information in backhaul adaptation protocol (BAP) headers. The wireless node may transmit a packet that includes extended routing information in a BAP header based at least in part on the configuration. In some aspects, a wireless node may receive a packet that includes extended routing information in a BAP header. The wireless node may process the packet based at least in part on the extended routing information in the BAP header. Numerous other aspects are described.

30 Claims, 12 Drawing Sheets

EXTENDED ROUTING IDENTIFIERS FOR INTEGRATED ACCESS AND BACKHAUL

FIELD OF THE DISCLOSURE

Aspects of the present disclosure generally relate to wireless communication and to techniques and apparatuses for extended routing identifiers for integrated access and backhaul (IAB).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a wireless node. The method may include receiving a configuration for including extended routing information in backhaul adaptation protocol (BAP) headers. The method may include transmitting a packet that includes extended routing information in a BAP header based at least in part on the configuration.

Some aspects described herein relate to a method of wireless communication performed by a wireless node. The method may include receiving a packet that includes extended routing information in a BAP header. The method may include processing the packet based at least in part on the extended routing information in the BAP header.

Some aspects described herein relate to a wireless node for wireless communication. The wireless node may include a memory and one or more processors coupled to the memory. The one or more processors may be configured to receive a configuration for including extended routing information in BAP headers. The one or more processors may be configured to transmit a packet that includes extended routing information in a BAP header based at least in part on the configuration.

Some aspects described herein relate to a wireless node for wireless communication. The wireless node may include a memory and one or more processors coupled to the memory. The one or more processors may be configured to receive a packet that includes extended routing information in a BAP header. The one or more processors may be configured to process the packet based at least in part on the extended routing information in the BAP header.

Some aspects described herein relate to a non-transitory computer-readable medium that stores a set of instructions for wireless communication by a wireless node. The set of instructions, when executed by one or more processors of the wireless node, may cause the wireless node to receive a configuration for including extended routing information in BAP headers. The set of instructions, when executed by one or more processors of the wireless node, may cause the wireless node to transmit a packet that includes extended routing information in a BAP header based at least in part on the configuration.

Some aspects described herein relate to a non-transitory computer-readable medium that stores a set of instructions for wireless communication by a wireless node. The set of instructions, when executed by one or more processors of the wireless node, may cause the wireless node to receive a packet that includes extended routing information in a BAP header. The set of instructions, when executed by one or more processors of the wireless node, may cause the wireless node to process the packet based at least in part on the extended routing information in the BAP header.

Some aspects described herein relate to an apparatus for wireless communication. The apparatus may include means for receiving a configuration for including extended routing information in BAP headers. The apparatus may include means for transmitting a packet that includes extended routing information in a BAP header based at least in part on the configuration.

Some aspects described herein relate to an apparatus for wireless communication. The apparatus may include means for receiving a packet that includes extended routing information in a BAP header. The apparatus may include means for processing the packet based at least in part on the extended routing information in the BAP header.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
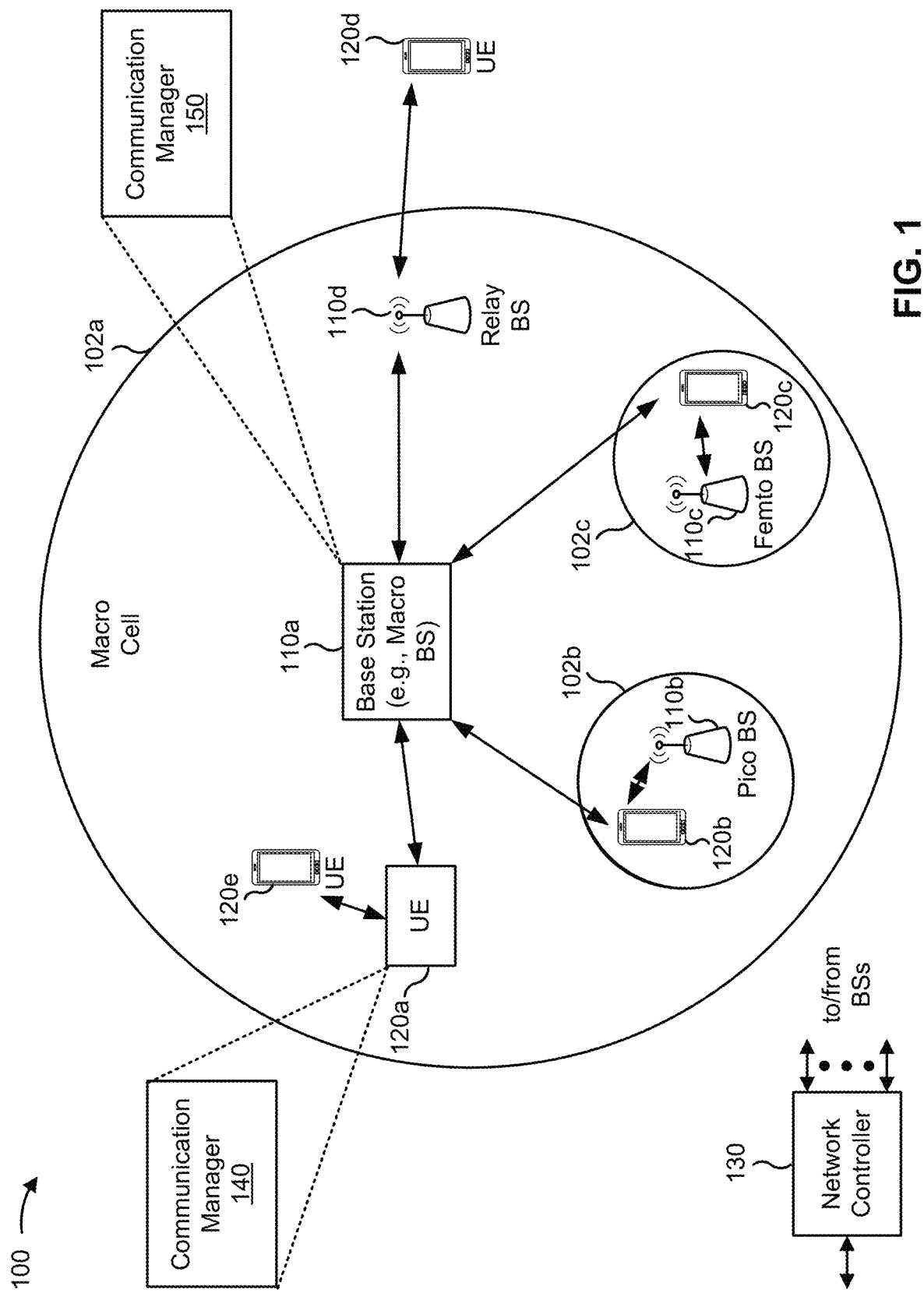
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a wireless node (e.g., a base station 110, a UE 120, or another type of wireless communication device described herein) may include a communication manager 140. As described in more detail elsewhere herein, the communication manager 140 may receive a configuration for including extended routing information in backhaul adaptation protocol (BAP) headers; and transmit a packet that includes extended routing information in a BAP header based at least in part on the configuration. Additionally, or alternatively, the communication manager 140 may perform one or more other operations described herein.

In some aspects, a wireless node (e.g., a base station 110, a UE 120, or another type of wireless communication device described herein) may include a communication manager 150. As described in more detail elsewhere herein, the communication manager 150 may receive a packet that includes extended routing information in a BAP header; and process the packet based at least in part on the extended routing information in the BAP header. Additionally, or alternatively, the communication manager 150 may perform one or more other operations described herein.

As indicated above, FIG. 1 is provided as an example. Other examples may differ from what is described with regard to FIG. 1.

Figure 2:
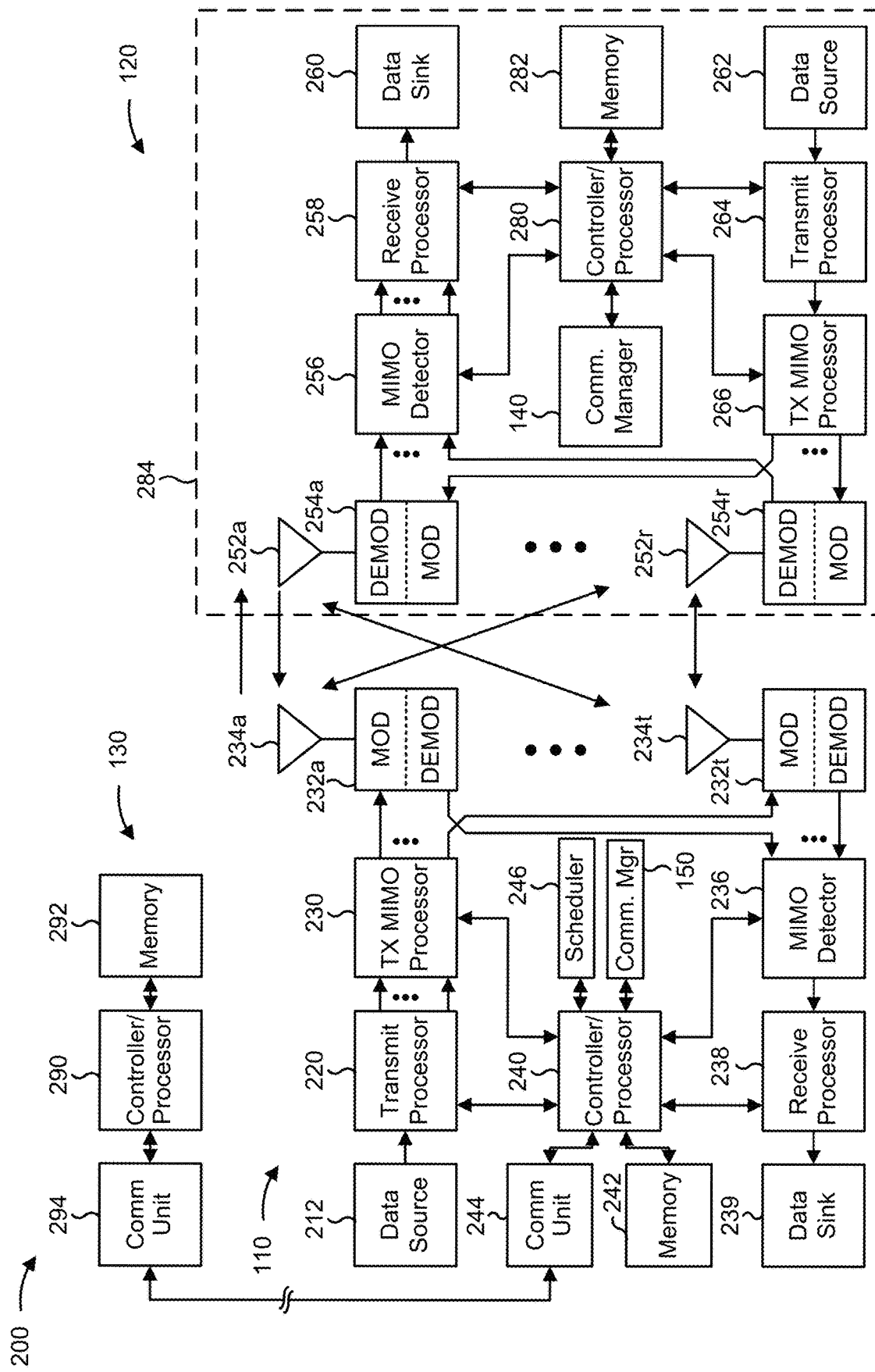
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-12).

The controller/processor 240 of the base station 110, the controller/processor 280 of the UE 120, and/or any other component(s) of FIG. 2 may perform one or more techniques associated with integrated access and backhaul (IAB) BAP routing over sidelink, as described in more detail elsewhere herein. In some aspects, a wireless node or an IAB donor described herein is the base station 110, is included in the base station 110, or includes one or more components of the base station 110 shown in FIG. 2. In some aspects, a wireless node or an IAB donor described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a wireless node (e.g., a base station 110, a UE 120, or another type of wireless communication device described herein) includes means for receiving a configuration for including extended routing information in BAP headers; and/or means for transmitting a packet that includes extended routing information in a BAP header based at least in part on the configuration. In some aspects, the means for the wireless node to perform operations described herein may include, for example, one or more of communication manager 140, transmit processor 220, TX MIMO processor 230, modem 232, antenna 234, MIMO detector 236, receive processor 238, controller/processor 240, memory 242, or scheduler 246. In some aspects, the means for the wireless node to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the wireless node includes means for receiving a packet that includes extended routing information in a BAP header; and/or means for processing the packet based at least in part on the extended routing information in the BAP header. In some aspects, the means for the wireless node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the wireless node to perform operations described herein may include, for example, one or more of communication manager 150, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
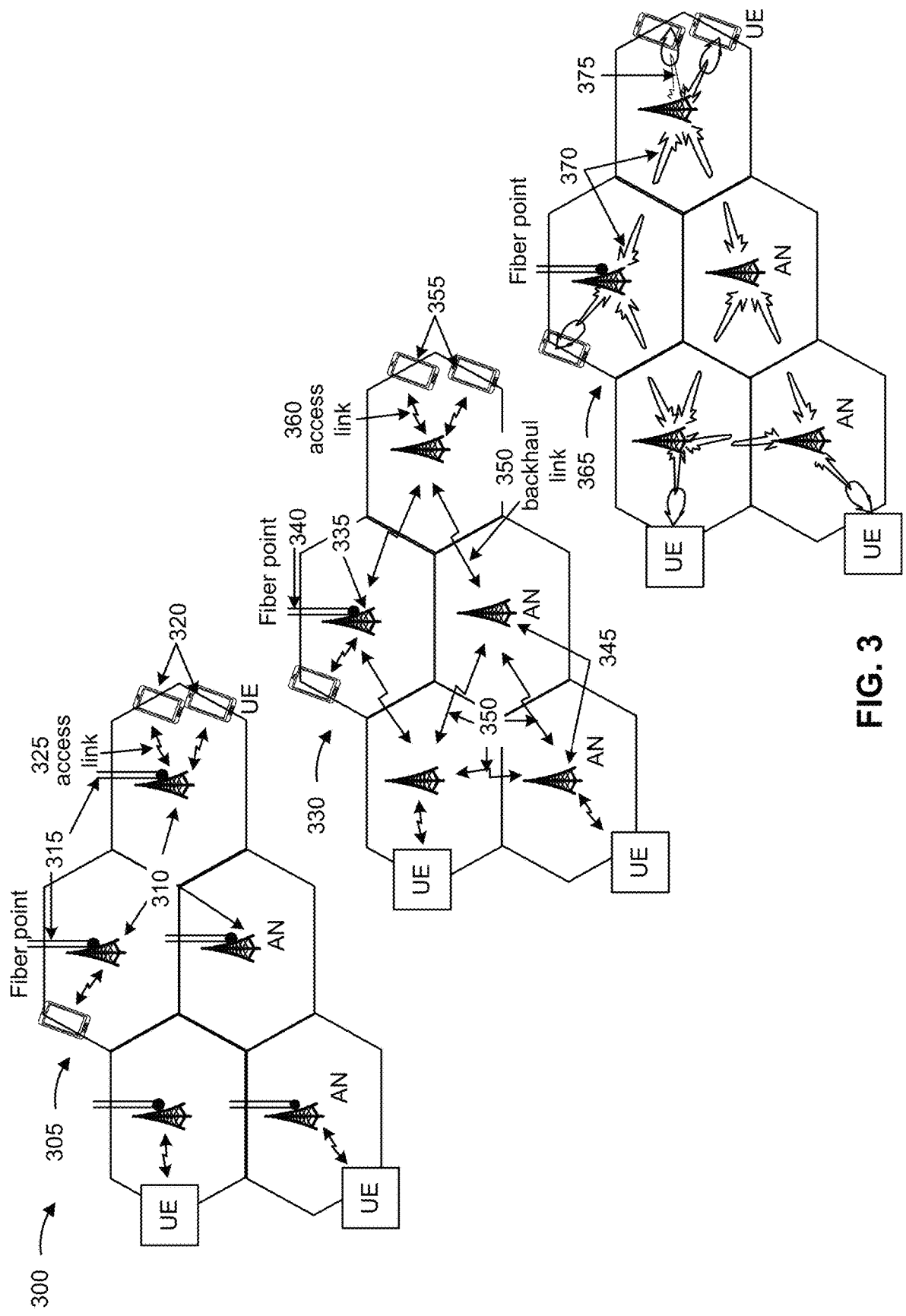
FIG. 3 is a diagram illustrating examples of radio access networks, in accordance with the present disclosure.

FIG. 3 is a diagram illustrating examples 300 of radio access networks, in accordance with the present disclosure.

As shown by reference 305, a traditional (e.g., 3G, 4G, or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference 330, a radio access network may include a wireless backhaul network, sometimes referred to as an IAB network. In an IAB network, at least one base station is an anchor base station 335 that communicates with a core network via a wired backhaul link 340, such as a fiber connection. An anchor base station 335 may also be referred to as an IAB donor (or IAB donor). The IAB network may include one or more non-anchor base stations 345, sometimes referred to as relay base stations or IAB nodes (or IAB nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, an anchor node may refer to a UE that is directly in communication with a base station (e.g., an anchor base station or a non-anchor base station).

In some aspects, extended routing identifiers for IAB, as described herein, may be utilized in an IAB network described in association with FIG. 3.

As indicated above, FIG. 3 is provided as an example. Other examples may differ from what is described with regard to FIG. 3.

Figure 4:
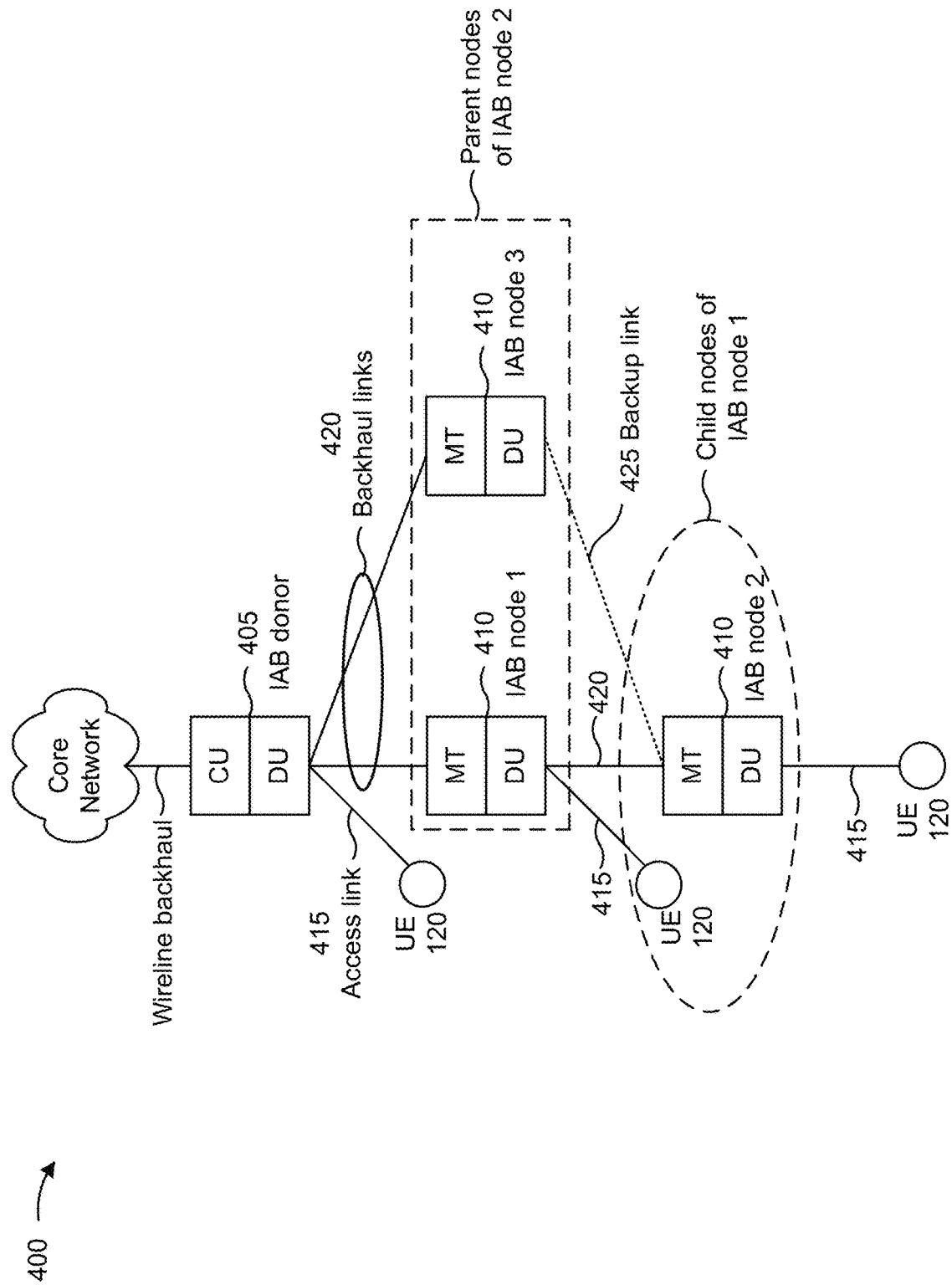
FIG. 4 is a diagram illustrating an example of an integrated access and backhaul (IAB) network architecture, in accordance with the present disclosure.

FIG. 4 is a diagram illustrating an example 400 of an IAB network architecture, in accordance with the present disclosure.

As shown in FIG. 4, an IAB network may include an IAB donor 405 (shown as IAB donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (e.g., access and mobility management function (AMF)). In some aspects, an IAB donor 405 may include a base station 110, such as an anchor base station 335, as described above in connection with FIG. 3. As shown, an IAB donor 405 may include a central unit (CU), which may perform access node controller (ANC) functions and/or AMF functions. The CU may configure a distributed unit (DU) of the IAB donor 405 and/or may configure one or more IAB nodes 410 (e.g., a mobile termination (MT) and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message or an F1 application protocol (F1-AP) message).

As further shown in FIG. 4, the IAB network may include IAB nodes 410 (shown as IAB node 1, IAB node 2, and IAB node 3) that connect to the core network via the IAB donor 405. As shown, an IAB node 410 may include MT functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB node 2 and IAB node 3 may be used for backhaul communications if a primary backhaul link between IAB node 2 and IAB node 1 fails. As used herein, a node or a wireless node may refer to an IAB donor 405 or an IAB node 410.

In some aspects, extended routing identifiers for IAB, as described herein, may be utilized in an IAB network having the network architecture described in association with FIG. 4.

As indicated above, FIG. 4 is provided as an example. Other examples may differ from what is described with regard to FIG. 4.

Figure 5:
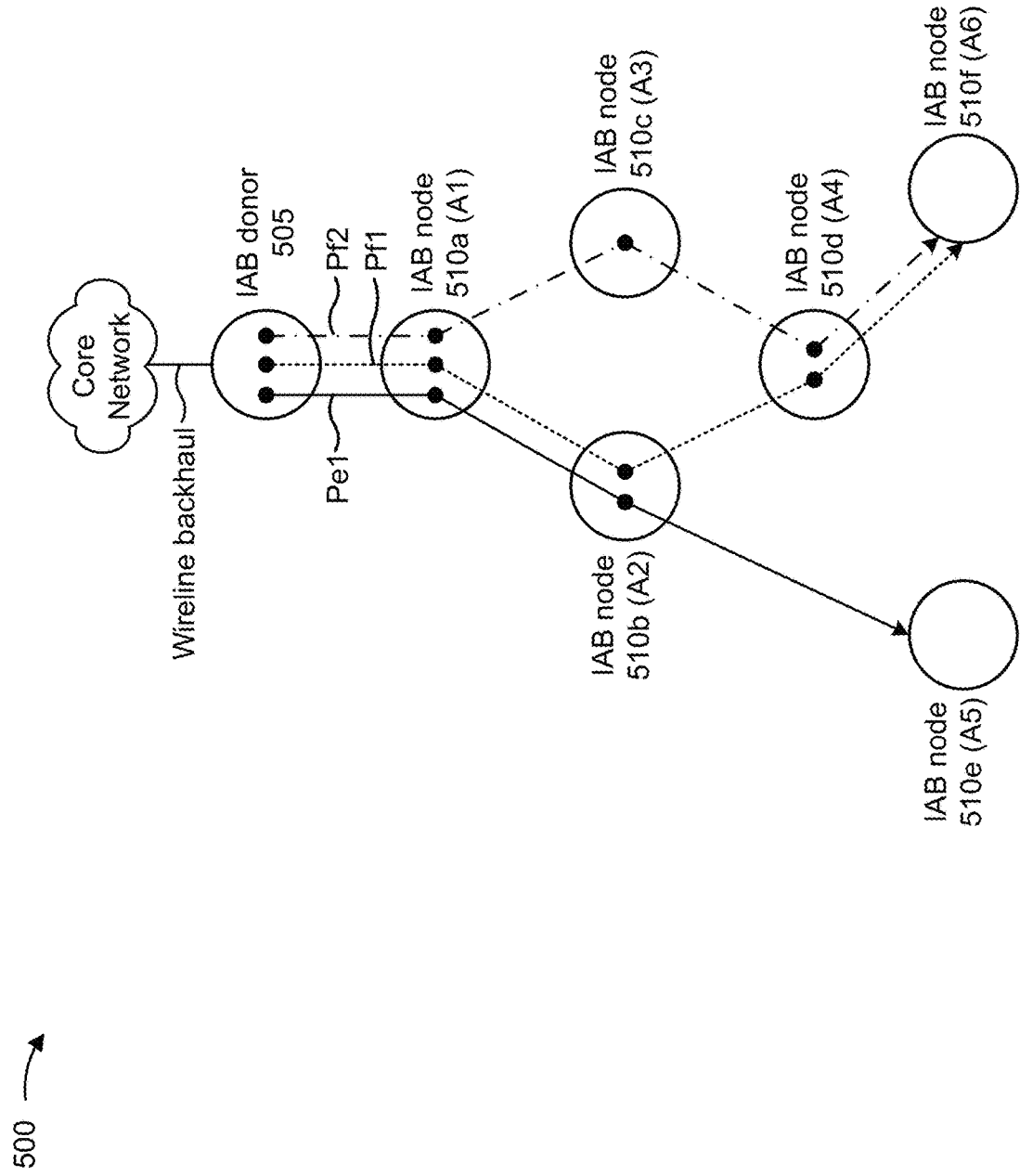
FIG. 5 is a diagram illustrating an example of backhaul adaptation protocol (BAP) routing across a wireless backhaul, such an IAB network, in accordance with the present disclosure.

FIG. 5 is a diagram illustrating an example 500 of routing across a wireless backhaul such as an IAB network, in accordance with the present disclosure. Example 500 includes an IAB donor 505 (e.g., base station 110, anchor base station 335, a DU of IAB donor 405, or the like), and a set of IAB nodes 510a through 510f (e.g., a set of wireless nodes including one or more base stations 110, UEs 120, anchor base stations 335, non-anchor base stations 345, IAB nodes 410, or the like). Communications may be routed from the IAB donor 505 to an endpoint via one or more of the IAB nodes 510. BAP layers of the IAB nodes 510 and the IAB donor 505 may facilitate the routing of such communications, as described below. Each IAB node 510 may be associated with an identifier, herein referred to as a BAP address. For example, IAB node 510a is associated with a BAP address of "A1," IAB node 510b is associated with a BAP address of "A2," and so on. A BAP address may be used to indicate a destination node for a packet. For example, the destination node may an IAB node 510 serving as an access node for a UE 120 (not shown) in the downstream direction (i.e., from the IAB donor 505 to the UE through one or more IAB nodes 510) or may be the IAB donor 505 in the upstream direction (i.e., from the UE 120 through one or more IAB nodes 510).

A packet may be routed via a path according to the BAP protocol. Three example paths are shown in FIG. 5. The three paths are differentiated from each other by different line patterns. Each path is associated with a path identifier, herein referred to as a BAP path identifier. A given IAB node 510 may be configured with information (referred to herein as a routing configuration) indicating a next hop corresponding to a combination of a given BAP path identifier and a given BAP address. The BAP path identifier can differentiate multiple routes to the same destination node. For example, a first path, shown by a dotted arrow, is associated with a path identifier of Pf1 and a second path, shown by a dotted and dashed arrow, is associated with a BAP path identifier of Pf2. In this case, the first path and the second path both lead to IAB node 510f. By configuring different paths between the same source and destination nodes (e.g., between the IAB donor 505 and the IAB node 510f) using different path identifiers, the IAB donor provides resilience and multiple options for routing to a given destination node (e.g., if a node on the first path fails, the packet can instead be routed via the second path), as well as enabling load balancing across the topology.

A transmitting node (e.g., the IAB donor 505 or an IAB node 510) may generate a packet including a BAP header. For example, the BAP layer of the transmitting node may add the BAP header when the packet enters the BAP layer of the transmitting node from an upper layer. The BAP header may identify a BAP routing identifier. The BAP routing identifier may include a BAP address of a destination node of the packet, as well as a BAP path identifier for a path to the destination node. On intermediate hops, the packet is routed to a next hop based at least in part on the BAP routing identifier and based at least in part on the routing configuration described above. Once the destination node receives the packet, the destination node may identify the packet as destined to the destination node based at least in part on the BAP address identified by the BAP routing identifier.

For example, referring to example 500, a packet generated by the IAB donor 505 may be destined to IAB node 510f. The packet may include a BAP header. The BAP header may identify a BAP routing identifier, which may indicate a BAP address of A6 and a BAP route identifier of Pf1. The IAB donor 505 may transmit the packet to IAB node 510a. IAB node 510a may determine that the packet is not destined to IAB node 510a (since the BAP address of A6 does not match IAB node 510a's BAP address of A1). Furthermore, IAB node 510a may be configured with a routing configuration indicating that a next hop associated with the BAP routing identifier is IAB node 510b. IAB node 510b may perform similar operations as IAB node 510a, and may determine, based at least in part on a routing configuration, that the next hop associated with the BAP routing identifier is IAB node 510d. IAB node 510d may perform similar operations as IAB nodes 510a and 510b, and may determine, based at least in part on a routing configuration, that the next hop associated with the BAP routing identifier is IAB node 510f. IAB node 510f may determine that the packet is destined to IAB node 510f (since the BAP address of A6 matches IAB node 510f's BAP address of A6). IAB node 510f may provide a payload of the packet to a UE 120 associated with IAB node 510f (such as a UE 120 to which the packet is destined as identified by the packet).

In some aspects, extended routing identifiers for IAB, as described herein, may be utilized for routing performed across an IAB network as described in association with FIG. 5.

As indicated above, FIG. 5 is provided as an example. Other examples may differ from what is described with regard to FIG. 5.

Figure 6:
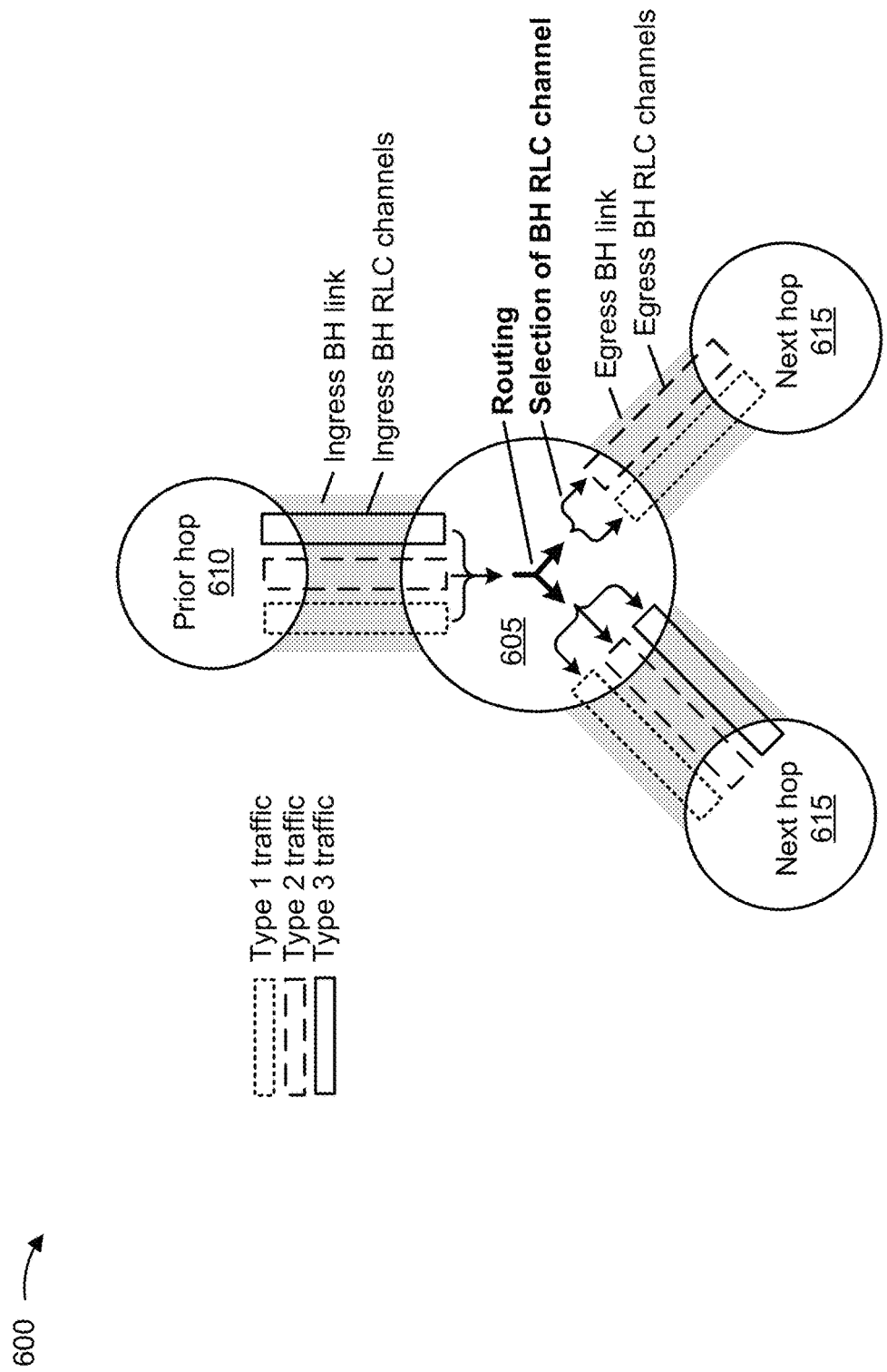
FIG. 6 is a diagram illustrating an example of a radio link control channel configuration for BAP routing, in accordance with the present disclosure.

FIG. 6 is a diagram illustrating an example 600 of a radio link control (RLC) channel configuration for BAP routing, in accordance with the present disclosure. Example 600 illustrates ingress and egress links for a wireless node 605. The wireless node 605 may be on a route associated with BAP routing of packets via a wireless backhaul such as an IAB network. Example 600 also illustrates a wireless node 610 that is a prior hop of the on the route and a pair of wireless nodes 615 that are next hops on the route (e.g., the wireless nodes 615 may be associated with different routes). Each of the wireless nodes 605, 610, and 615 may be, for example, a UE 120, a base station 110, an anchor base station 335, a non-anchor base station 345, an IAB donor 405, an IAB node 410, an IAB donor 505, an IAB node 510, or the like. The wireless nodes 605, 610, and 615 are linked by backhaul (BH) links. For example, a BH link between the wireless node 605 and the wireless node 610 is shown as an ingress BH link (since traffic on the ingress BH link is inbound to the wireless node 605), and BH links between the wireless node 605 and the wireless nodes 615 are shown as egress BH links (since traffic on the egress BH links is outbound from the wireless node 605).

The wireless nodes 605, 610, and 615 may communicate via RLC channels on the various BH links That is, traffic on the ingress link and/or the egress link(s) may be communicated on a BH link via a given RLC channel (herein referred to as a BH RLC channel). A BH RLC channel can be used for transporting (e.g., backhauling) traffic between IAB nodes, or between an IAB donor and an IAB node. A given BH RLC channel may be mapped to one or more UE radio bearers. For example, several UE radio bearers may be multiplexed onto a single BH RLC channel based at least in part on a quality of service (QoS) profile of the UE radio bearers. As another example, a single UE radio bearer may be mapped to a single BH RLC channel, which enables more granular control of QoS profiles and other parameters. Thus, BH RLC channels support backhauling of UE traffic based at least in part on parameters associated with the UE traffic.

In some aspects, a given BH RLC channel is associated with a particular type of traffic. For example, as indicated in FIG. 6, one or more BH RLC channels may be associated with a first type of traffic (Type 1 traffic), one or more BH RLC channels may be associated with a second type of traffic (Type 2 traffic), and one or more BH RLC channels may be associated with a third type of traffic (Type 3 traffic). The type of traffic associated with a given BH RLC channel may include, for example, signaling traffic, best effort traffic, low latency traffic, or another type of traffic. In this way, QoS and traffic prioritization on the backhaul can be enforced through a number of BH RLC channels per backhaul link. Upper layer traffic (e.g., traffic originating from above the RLC layer) may be mapped to a BH RLC channel. For example, upper layer traffic associated with an F1-U interface or an X2-U interface may be mapped at a GTP-U tunnel granularity, upper layer traffic associated with an F1-C interface may be mapped at a granularity of non-UE-associated F1-AP versus UE-associated F1-AP, and non-F1 interface traffic may be mapped at a granularity of a type (e.g., different classes of operations, administration, and management (OAM) traffic). Mapping may occur at an entry point of the traffic to the BAP layer, such as at an access IAB node for uplink traffic or at an IAB donor for downlink traffic. At intermediate hops, egress BH RLC channels may be mapped from ingress BH RLC channels.

In some aspects, extended routing identifiers for IAB, as described herein, may utilized in conjunction with an RLC channel configuration described in association with FIG. 6.

As indicated above, FIG. 6 is provided as an example. Other examples may differ from what is described with regard to FIG. 6.

Figure 7:
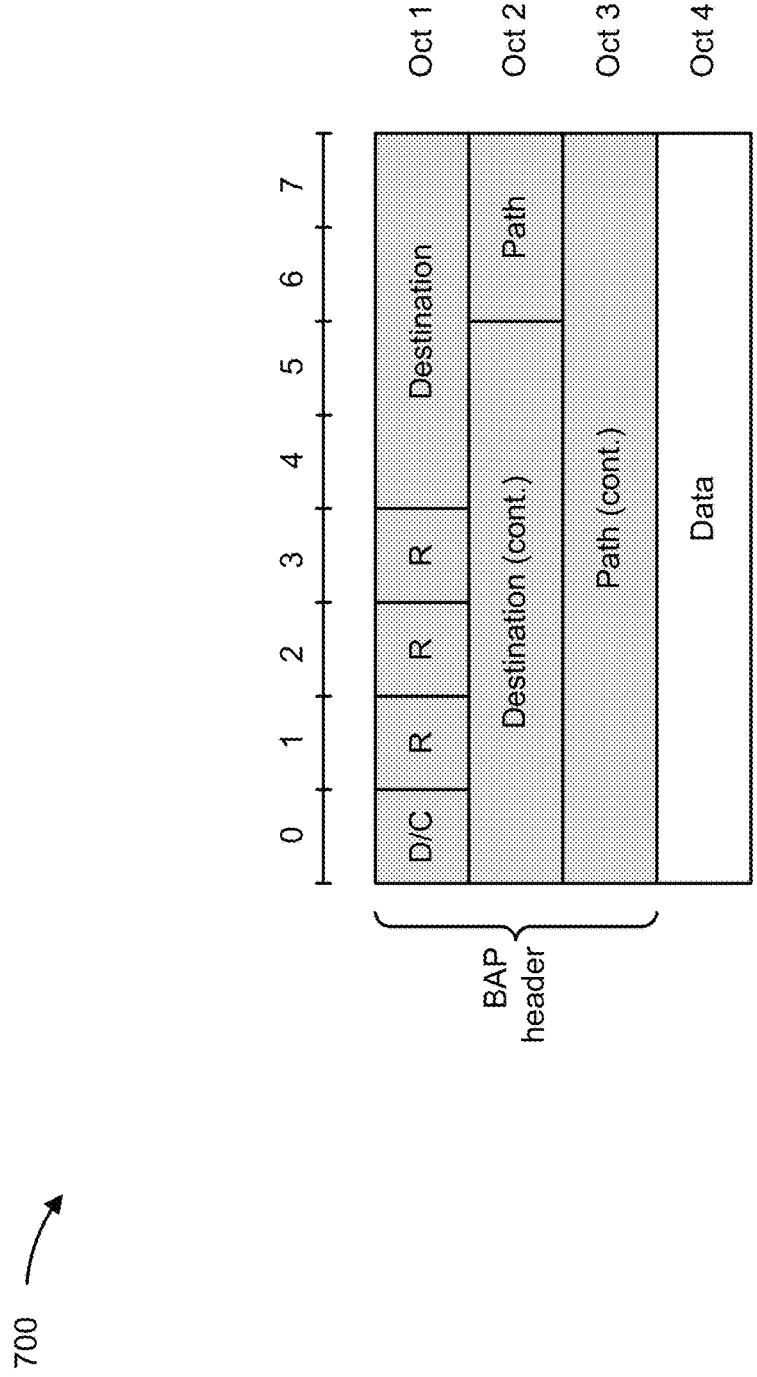
FIG. 7 is a diagram illustrating an example of a conventional BAP header, in accordance with the present disclosure.

FIG. 7 is a diagram illustrating an example 700 of a conventional BAP header, in accordance with the present disclosure. A BAP protocol data unit (PDU) can be used to convey a BAP PDU header (herein referred to as a BAP header) along upper layer data or control information. As illustrated in FIG. 7, a BAP PDU comprises a bit string that is byte aligned (i.e., multiple of 8 bits) in length.

Conventionally, as illustrated in FIG. 7, the BAP header comprises a 1-bit data/control (D/C) field that can be used to indicate whether the BAP PDU is a BAP data PDU or a BAP control PDU. As further shown, the conventional BAP header comprises a three reserved (R) bits. As further shown, the conventional BAP header comprises a 10 bit destination field. The destination field is used to carry a BAP address of destination (e.g., an IAB node, an IAB donor, or the like) of the BAP PDU. As further shown, the conventional BAP header comprises a 10 bit path field. The path field is used to carry a BAP path identifier that identifies a BAP route associated with routing the BAP PDU. Notably, the destination field and the path field collectively carry the BAP routing identifier associated with the BAP PDU. Finally, the data field of the BAP PDU is used to carry a BAP service data unit (SDC) (e.g., an Internet protocol (IP) packet), and may have a variable bit length.

In some aspects, extended routing identifiers for IAB, as described herein, may be utilized to improve the conventional BAP header described in association with FIG. 7.

As indicated above, FIG. 7 is provided as an example. Other examples may differ from what is described with regard to FIG. 7.

Conventionally, a BAP route comprises a sequence of BH links between DUs and MTs. For example, in a downlink direction, a BAP route conventionally includes a BH link between a DU of an IAB donor and an MT of a first wireless node (e.g., a first IAB node), and a BH link between a DU of the first wireless node and an MT of a second wireless node (e.g., a second IAB node). In the uplink direction, a BAP route conventionally includes a BH link between an MT of a first wireless node and a DU of a second wireless node, and a BH link between an MT of the second wireless node and a DU of an IAB donor. As noted above, MT functionality at a given wireless node is similar to UE functionality.

In some IAB networks, BAP routing may be extended beyond the conventional configuration described above. For example, BAP routing may in some cases be extended to BAP routes defined between IAB nodes, to BAP routes that comprise a mixture of DU-to-MT links and MT-to-DU links, or to BAP routes that include one or more sidelink connections (e.g., over MT-to-MT links) These types of extensions increase a total quantity of BAP routes and/or a total quantity of BAP addresses needed in the IAB network. Therefore, in some scenarios, the BAP routing identifier in the conventional BAP header (described above with respect to FIG. 7) may be insufficient. That is, an extension of the BAP routing identifier may be needed in order to support extended BAP routing in an IAB network.

Some techniques and apparatuses described herein enable extended routing identifiers for IAB. Extending a routing identifier (e.g., a BAP routing identifier) enables extension of BAP routing to, for example, BAP routes defined between IAB nodes, BAP routes that comprise a mixture of DU-to-MT links and MT-to-DU links, to BAP routes that include one or more sidelink connections, or another type of configuration for which an extended BAP routing identifier is needed.

In some aspects, to enable extended routing identifiers for IAB, a wireless node may receive a configuration for including extended routing information in BAP headers and may transmit a packet that includes extended routing information in a BAP header based at least in part on the configuration. In some aspects, a wireless node may receive a packet that includes extended routing information in a BAP header and may process the packet based at least in part on the extended routing information in the BAP header. Additional details are provided below.

Figure 8:
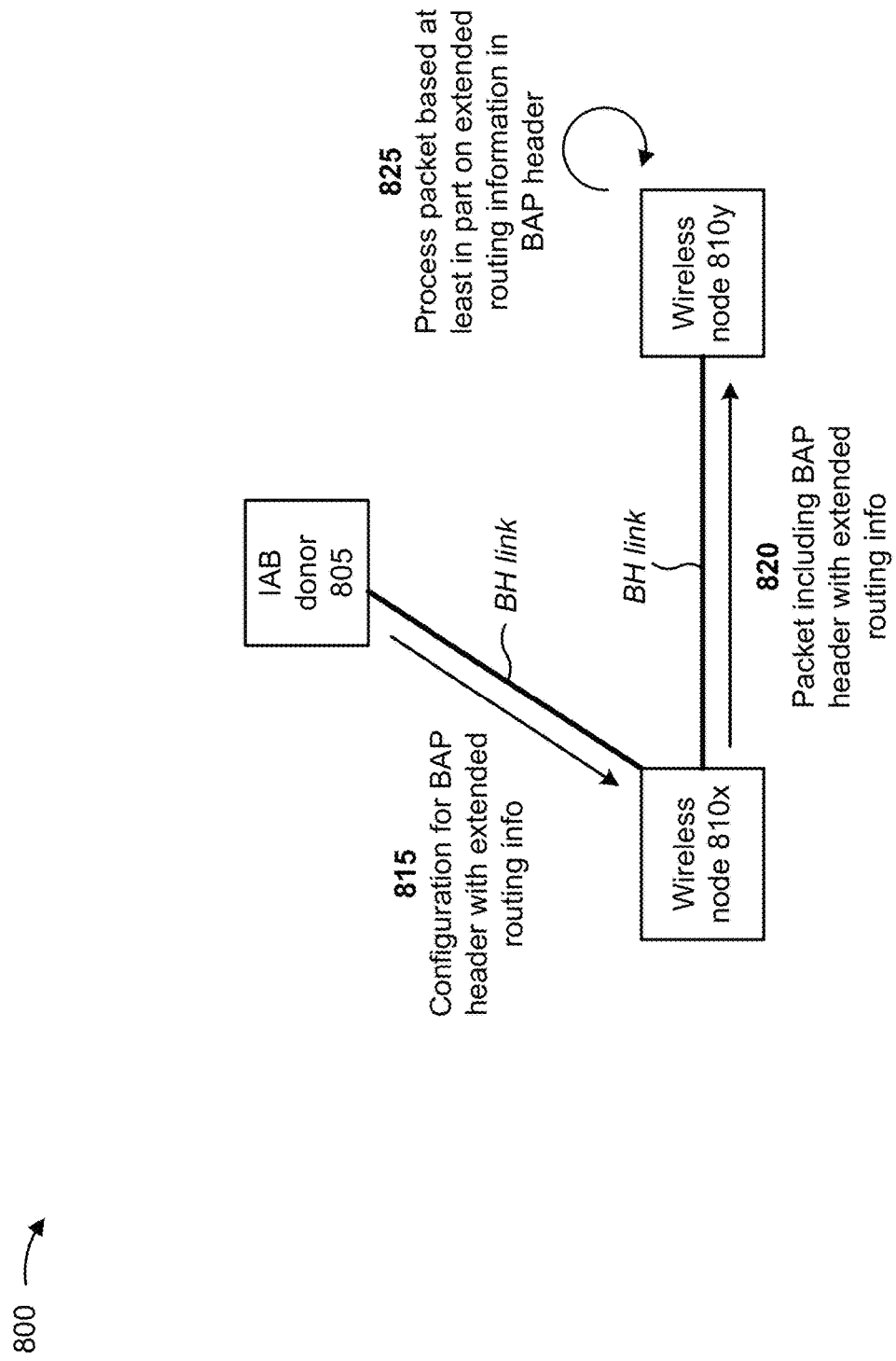
FIG. 8 is a diagram illustrating an example associated with extended routing identifiers for IAB, in accordance with the present disclosure.

FIG. 8 is a diagram illustrating an example 800 associated with extended routing identifiers for IAB, in accordance with the present disclosure.

As shown in FIG. 8, example 800 includes communication among an IAB donor 805, a wireless node 810x, and a wireless node 810y. In some aspects, the IAB donor 805, the wireless node 810x, and the wireless node 810y may be included in an IAB network. The IAB donor 805 may include, for example, a base station 110, an anchor base station 335, an IAB donor 405, an IAB donor 505, an IAB node 510, a wireless node 610, or the like. A wireless node 810 (e.g., the wireless node 810x, the wireless node 810y) may include, for example, a UE 120, a base station 110, an anchor base station 335, a non-anchor base station 345, an IAB donor 405, an IAB node 410, an IAB donor 505, an IAB node 510, a wireless node 605, a wireless node 610, a wireless node 615, or the like. In some aspects, the wireless node 810x may be an access node of the IAB network, and the wireless node 810y may be an intermediate node or an access node of the IAB network.

As shown in FIG. 8, the IAB donor 805, the wireless node 810x, and the wireless node 810y, may communicate over wireless links, such as a BH links, sidelinks, or one or more other types of wireless links. For example, a DU of the IAB donor 805 and an MT of the wireless node 810x may communicate over a BH link for uplink and downlink communications, and a DU of the wireless node 810x and an MT of the wireless node 810y may communicate over a BH link for uplink and downlink communications. In some aspects, a sidelink may be established between the wireless nodes 810 (not shown).

As shown by reference 815, the IAB donor 805 may transmit, and the wireless node 810x may receive, a configuration for including extended routing information in BAP headers. In some aspects, the configuration includes an indication that the wireless node 810x is to utilized extended routing information. That is, the configuration may serve as an indication that the wireless node 810x is to include extended routing information in BAP headers attached to packets (e.g., IP packets) that are to be transmitted by the wireless node 810x. In some aspects, the configuration may indicate a configuration to be used by the wireless node 810x for formatting, generating, or otherwise determining extended routing information. For example, the configuration may indicate a length (e.g., a quantity of bits, a quantity of octets, or the like) of the extended routing information (e.g., a length of an extended destination field, a length of an extended path field, or the like). In some aspects, the extended routing information configured by the configuration may include an extended destination field (e.g., a destination field with a length of more than 10 bits), an extended path field (e.g., a path field with a length of more than 10 bits), or the like. In some aspects, the IAB donor 805 may transmit a similar configuration for including extended routing information in BAP headers to the wireless node 810y and/or one or more other wireless nodes 810 (not shown).

As shown by reference 820, the wireless node 810x may transmit a packet that includes extended routing information in a BAP header based at least in part on the configuration. For example, the wireless node 810x may receive a packet from a UE 120 via an access link (not shown). The wireless node 810x may then generate a BAP PDU comprising a BAP header with extended routing information (e.g., an extended routing identifier).

In some aspects, the extended routing information includes an extension of at least one of a BAP routing identifier (e.g., carried in a destination field and a path field, at least one of which has a length of more than 10 bits), a BAP address (e.g., carried in a destination field with a length of more than 10 bits), or a BAP path identifier (e.g., carried in a path field with of length of more than 10 bits).

In some aspects, the BAP header includes an indication that the BAP header carries the extended routing information. In some aspects, the indication may be provided in control bit of the BAP header. That is, in some aspects, the control bit may be used to indicate use of the routing extension. In some aspects, the indication may be provided in a reserved bit of the BAP header. That is, in some aspects, a reserved bit may be used to indicate use of the routing extension.

In some aspects, the indication is provided via one or more reserved values in a field of the BAP header. The one or more reserved values may include a reserved value of a BAP routing identifier, a reserved value of a BAP address, or a reserved value of a BAP path identifier. That is, in some aspects, a reserved routing identifier value, a reserved BAP address value, or a reserved path identifier value may be used in a header field value to indicate use of the routing extension.

In some aspects, the indication is provided via a length field of the BAP header. That is, a length field of the BAP header may be used to indicate use of the routing extension (e.g., by specifying a length of the routing information).

In some aspects, the wireless node 810x may transmit, and the IAB donor 805 may receive, an indication of a capability to support BAP routing based at least in part on extended routing information. In some aspects, the IAB donor 805 may transmit the configuration to the wireless node 810x based at least in part on receiving the indication that the wireless node 810x is capable of supporting BAP routing based at least in part on extended routing information.

As shown by reference 825, the wireless node 810y may receive the packet that includes the extended routing information in the BAP header and may process the packet based at least in part on the extended routing information in the BAP header. For example, the wireless node 810y may receive the packet carrying the extended routing information and, when the wireless node 810y is not the destination node indicated by the routing information, may route the packet to a next hop in the IAB network (e.g., the wireless node 810y may route the packet to another wireless node 810). As another example, the wireless node 810y may receive the packet carrying the extended routing information and, when the wireless node 810y is the destination node indicated by the routing information, may forward the packet for upper layer processing.

In some aspects, the extended routing information may enable mesh routing over BH in an IAB network. For example, BH transport is typically restricted to being either an upstream direction (e.g., MT-to-DU, MT-to-DU, and so on.) or a downstream direction (e.g., DU-to-MT, DU-to-MT, and so on). However, in some IAB networks, mesh routing over BH in an IAB network can be configured, which allows traffic to be rerouted upstream via one or more descendant nodes of a given wireless node 810 or, similarly, downstream via one or more ascendant nodes of a given wireless node 810 (e.g., in the event of a BH radio link failure). Here, a destination field (e.g., a BAP address space) of 10 bits may be sufficient since a quantity of wireless nodes 810 may not increase. However, a quantity of BAP routes increases (quadratically), meaning that a path field (e.g., a BAP path identifier space) of 10 bits may be insufficient to enable BAP routing. In such a scenario, the extended routing information can be used to extend the path identifier (e.g., to more than 10 bits), thereby enabling mesh routing over BH in the IAB network.

In some aspects, the extended routing information may enable distributed routing among wireless nodes 810 of an IAB network. For example, distributed algorithms among wireless nodes 810 may be configured the IAB network (e.g., to improve routing performance and/or reliability). Here, each wireless node 810 may have a BAP address and an IP address, and an IP/BAP transport may be used for direct communication between pairs of wireless nodes 810. In such a scenario, a destination field (e.g., a BAP address space) of 10 bits may be sufficient since a quantity of wireless nodes 810 may not increase. However, due to the use of distributed algorithms, a quantity of BAP routes increases, meaning that a path field (e.g., a BAP path identifier space) of 10 bits may be insufficient to enable BAP routing. In such a scenario, the extended routing information can be used to extend path identifiers carried in the path field (e.g., to more than 10 bits), thereby enabling distributed routing algorithms among wireless nodes 810 in the IAB network.

In some aspects, the extended routing information may enable utilization of BAP routes that comprise one or more sidelink connections. For example, in some IAB networks, BAP routing may support the use of BAP routes that comprise one or more sidelink connections (e.g., connections between MTs of wireless nodes 810). In some aspects, BAP routing over sidelink connections provides richer connectivity in the IAB network, which increases robustness and/or enables improved load-balancing. In such a scenario, a destination field (e.g., a BAP address space) of 10 bits may be sufficient since a quantity of wireless nodes 810 may not increase. However, due to the use of BAP routes over sidelink connections, a quantity of BAP routes increases, meaning that a path field (e.g., a BAP path identifier space) of 10 bits may be insufficient to enable BAP routing. In such a scenario, the extended routing information can be used to extend the path identifier carried in the path field (e.g., to more than 10 bits), thereby enabling utilization of BAP routes that comprise one or more sidelink connections.

In some aspects, the extended routing information may enable sidelink connections to be used for multi-hop relaying. For example, the BAP can provide layer 2 (L2) relaying, routing, or QoS enforcement among wireless nodes 810 (e.g., among UEs 120) in some applications, such as an industrial IoT (IIoT) application. Here, quantity of wireless nodes 810 in a BAP-based network may BAP routing ID space (BAP address space and/or BAP path ID space) may be high, meaning that a destination field (e.g., a BAP address space) of 10 bits or a path field (e.g., a BAP path identifier space) of 10 bits may be insufficient to enable BAP routing. In such a scenario, the extended routing information can be used to extend the address identifier carried in the destination field (e.g., to more than 10 bits) or the path identifier carried in the path field (e.g., to more than 10 bits), thereby enabling sidelink connections to be used for multi-hop relaying.

As indicated above, FIG. 8 is provided as an example. Other examples may differ from what is described with respect to FIG. 8.

Figure 9:
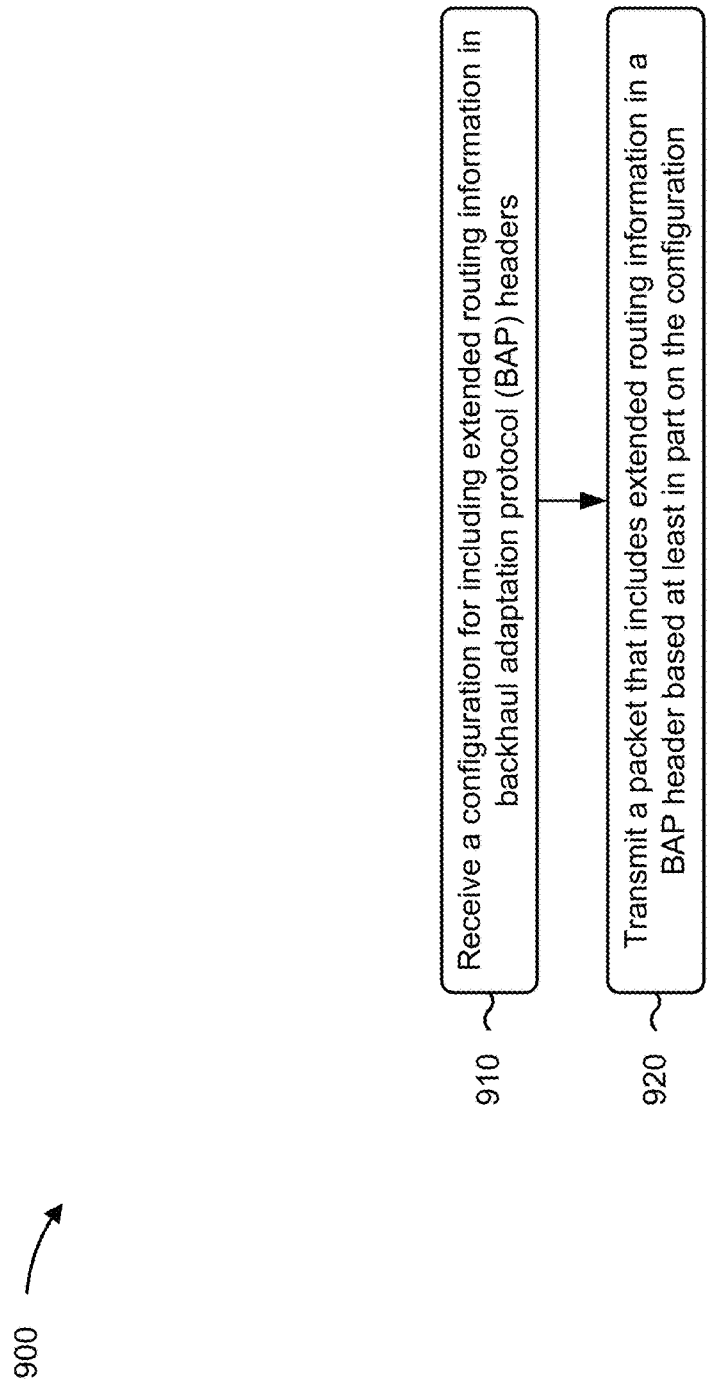
FIGS. 9 and 10 are diagrams illustrating example processes associated with IAB BAP routing over sidelink, in accordance with the present disclosure.

FIG. 9 is a diagram illustrating an example process 900 performed, for example, by a wireless node, in accordance with the present disclosure. Example process 900 is an example where the wireless node (e.g., wireless node 810) performs operations associated with extended routing identifiers for IAB.

As shown in FIG. 9, in some aspects, process 900 may include receiving a configuration for including extended routing information in BAP headers (block 910). For example, the wireless node (e.g., using communication manager 140 and/or reception component 1102, depicted in FIG. 11) may receive a configuration for including extended routing information in BAP headers, as described above.

As further shown in FIG. 9, in some aspects, process 900 may include transmitting a packet that includes extended routing information in a BAP header based at least in part on the configuration (block 920). For example, the wireless node (e.g., using communication manager 140 and/or transmission component 1104, depicted in FIG. 11) may transmit a packet that includes extended routing information in a BAP header based at least in part on the configuration, as described above.

Process 900 may include additional aspects, such as any single aspect or any combination of aspects described below and/or in connection with one or more other processes described elsewhere herein.

In a first aspect, the extended routing information includes an extension of at least one of a BAP routing identifier, a BAP address, or a BAP path identifier.

In a second aspect, alone or in combination with the first aspect, the BAP header includes an indication that the BAP header carries the extended routing information.

In a third aspect, alone or in combination with one or more of the first and second aspects, the indication is provided in a control bit of the BAP header or in a reserved bit of the BAP header.

In a fourth aspect, alone or in combination with one or more of the first through third aspects, the indication is provided via one or more reserved values in a header field of the BAP header, the one or more reserved values including at least one of a reserved value of a BAP routing identifier, a reserved value of a BAP address, or a reserved value of a BAP path identifier.

In a fifth aspect, alone or in combination with one or more of the first through fourth aspects, the indication is provided via a length field of the BAP header.

In a sixth aspect, alone or in combination with one or more of the first through fifth aspects, process 900 includes transmitting an indication of a capability to support BAP routing based at least in part on extended routing information.

In a seventh aspect, alone or in combination with one or more of the first through sixth aspects, the wireless node is an IAB node.

In an eighth aspect, alone or in combination with one or more of the first through seventh aspects, the wireless node is a user equipment.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
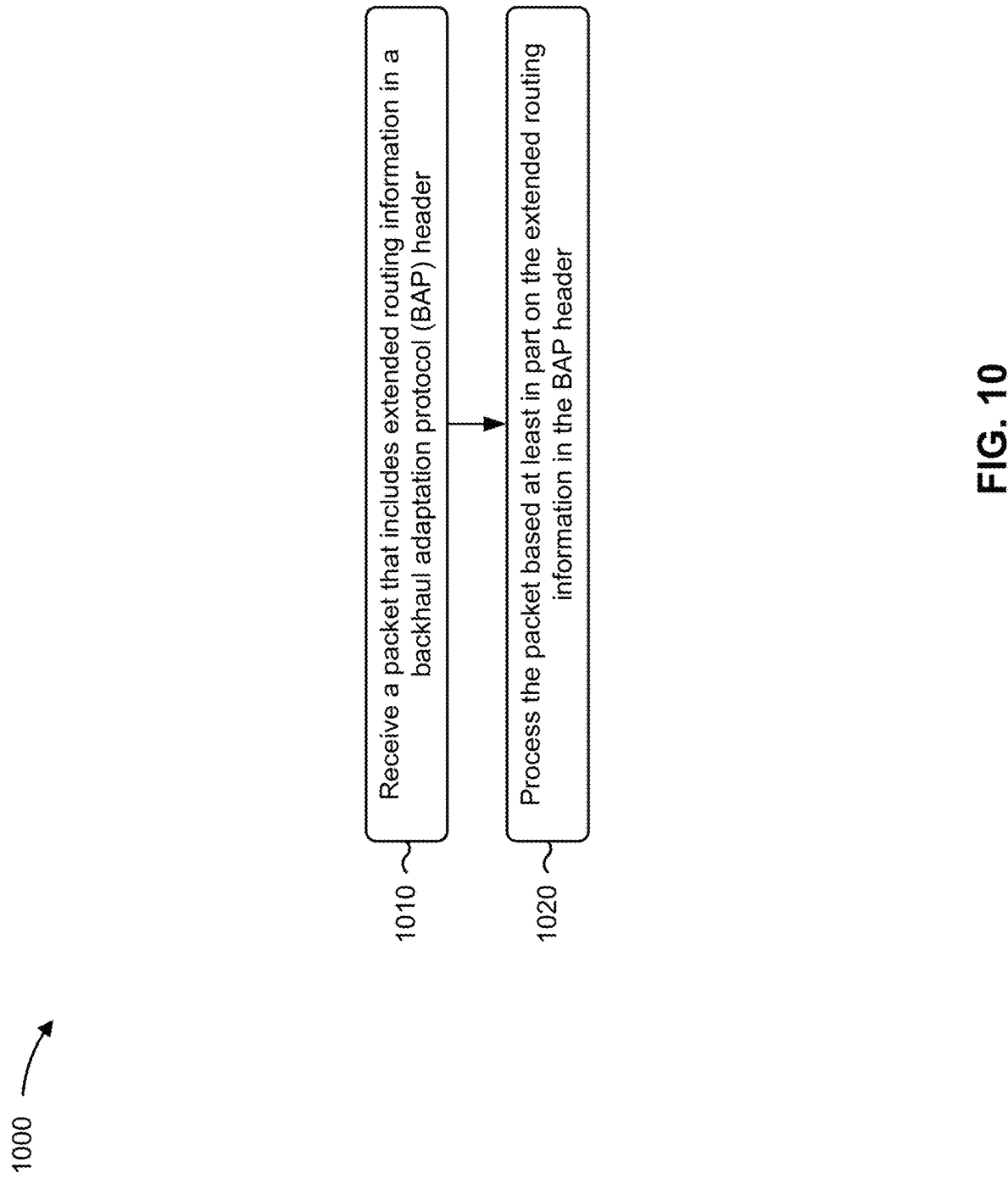

FIG. 10 is a diagram illustrating an example process 1000 performed, for example, by a wireless node, in accordance with the present disclosure. Example process 1000 is an example where the wireless node (e.g., wireless node 810) performs operations associated with extended routing identifiers for IAB.

As shown in FIG. 10, in some aspects, process 1000 may include receiving a packet that includes extended routing information in a BAP header (block 1010). For example, the wireless node (e.g., using communication manager 150 and/or reception component 1202, depicted in FIG. 12) may receive a packet that includes extended routing information in a BAP header, as described above.

As further shown in FIG. 10, in some aspects, process 1000 may include processing the packet based at least in part on the extended routing information in the BAP header (block 1020). For example, the wireless node (e.g., using communication manager 150 and/or packet processing component 1208, depicted in FIG. 12) may process the packet based at least in part on the extended routing information in the BAP header, as described above.

Process 1000 may include additional aspects, such as any single aspect or any combination of aspects described below and/or in connection with one or more other processes described elsewhere herein.

In a first aspect, the extended routing information includes an extension of at least one of a BAP routing identifier, a BAP address, or a BAP path identifier.

In a second aspect, alone or in combination with the first aspect, the BAP header includes an indication that the BAP header carries the extended routing information.

In a third aspect, alone or in combination with one or more of the first and second aspects, the indication is provided in a control bit of the BAP header or in a reserved bit of the BAP header.

In a fourth aspect, alone or in combination with one or more of the first through third aspects, the indication is provided via one or more reserved values in a header field of the BAP header, the one or more reserved values including at least one of a reserved value of a BAP routing identifier, a reserved value of a BAP address, or a reserved value of a BAP path identifier.

In a fifth aspect, alone or in combination with one or more of the first through fourth aspects, the indication is provided via a length field of the BAP header.

In a sixth aspect, alone or in combination with one or more of the first through fifth aspects, process 1000 includes transmitting an indication of a capability to support BAP routing based at least in part on extended routing information.

In a seventh aspect, alone or in combination with one or more of the first through sixth aspects, the wireless node is an IAB node.

In an eighth aspect, alone or in combination with one or more of the first through seventh aspects, the wireless node is a user equipment.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
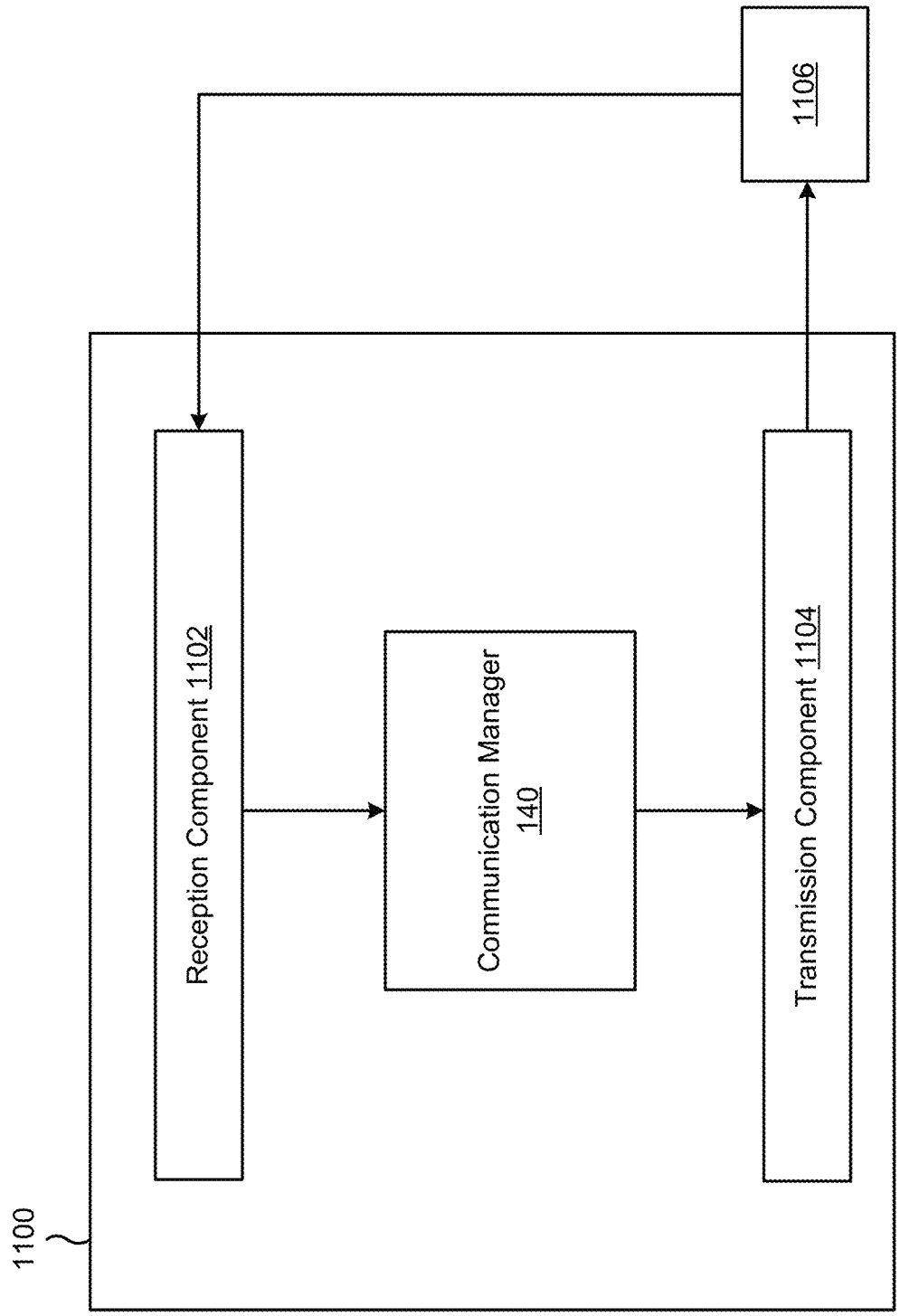
FIGS. 11 and 12 are diagrams of example apparatuses for wireless communication, in accordance with the present disclosure.

FIG. 11 is a diagram of an example apparatus 1100 for wireless communication. The apparatus 1100 may be a wireless node, or a wireless node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140.

In some aspects, the apparatus 1100 may be configured to perform one or more operations described herein in connection with FIG. 8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the wireless node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the wireless node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the wireless node described in connection with FIG. 2. In some aspects, the transmission component 1104 may be co-located with the reception component 1102 in a transceiver.

The reception component 1102 may receive a configuration for including extended routing information in BAP headers. The transmission component 1104 may transmit a packet that includes extended routing information in a BAP header based at least in part on the configuration.

The transmission component 1104 may transmit an indication of a capability to support BAP routing based at least in part on extended routing information.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
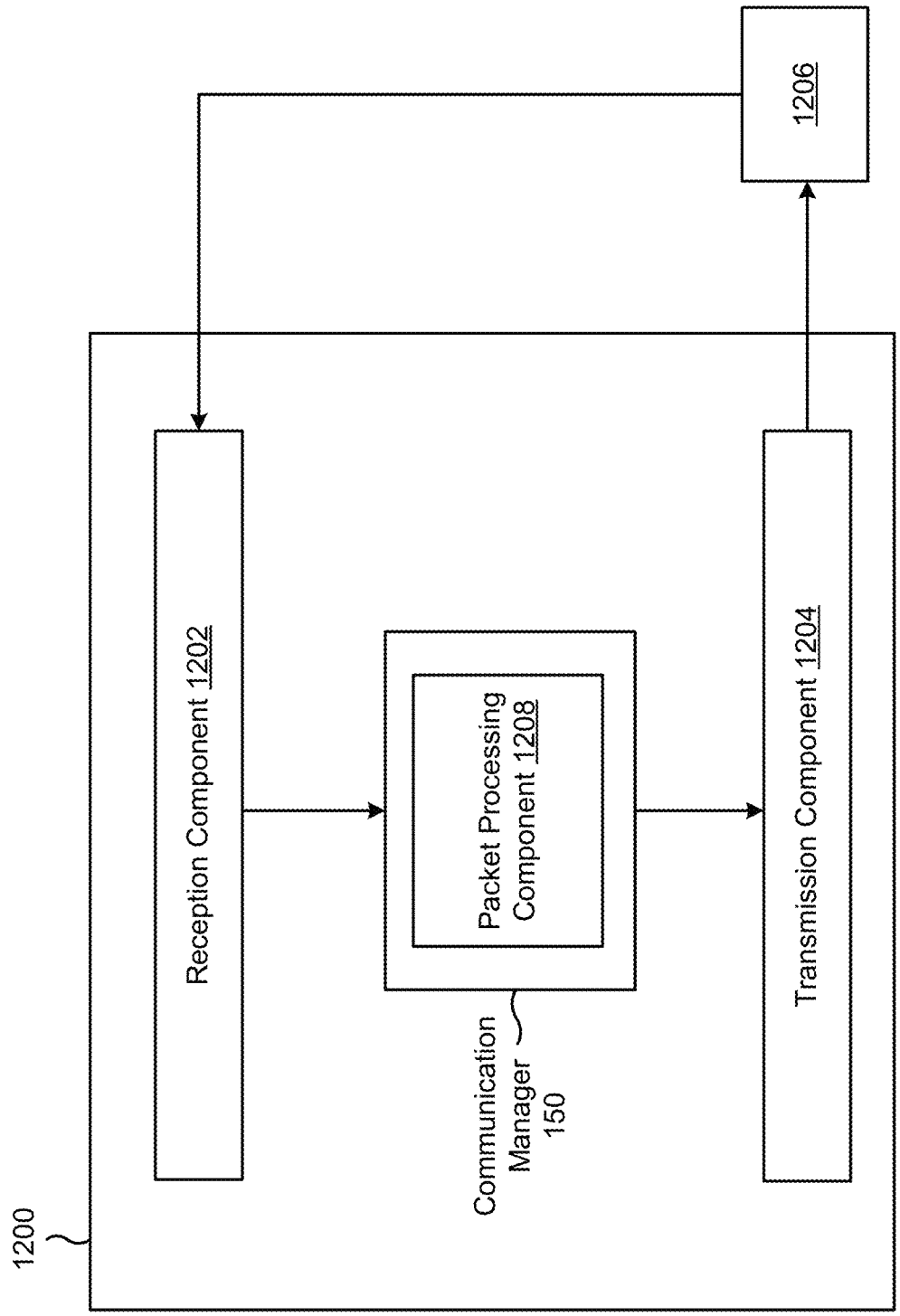

FIG. 12 is a diagram of an example apparatus 1200 for wireless communication. The apparatus 1200 may be a wireless node, or a wireless node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include a packet processing component 1208.

In some aspects, the apparatus 1200 may be configured to perform one or more operations described herein in connection with FIG. 8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the wireless node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the wireless node described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the wireless node described in connection with FIG. 2. In some aspects, the transmission component 1204 may be co-located with the reception component 1202 in a transceiver.

The reception component 1202 may receive a packet that includes extended routing information in a BAP header. The packet processing component 1208 may process the packet based at least in part on the extended routing information in the BAP header.

The transmission component 1204 may transmit an indication of a capability to support BAP routing based at least in part on extended routing information.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a wireless node, comprising: receiving a configuration for including extended routing information in BAP headers; and transmitting a packet that includes extended routing information in a BAP header based at least in part on the configuration.

Aspect 2: The method of Aspect 1, wherein the extended routing information includes an extension of at least one of a BAP routing identifier, a BAP address, or a BAP path identifier.

Aspect 3: The method of any of Aspects 1-2, wherein the BAP header includes an indication that the BAP header carries the extended routing information.

Aspect 4: The method of Aspect 3, wherein the indication is provided in a control bit of the BAP header or in a reserved bit of the BAP header.

Aspect 5: The method of any of Aspects 3-4, wherein the indication is provided via one or more reserved values in a header field of the BAP header, the one or more reserved values including at least one of a reserved value of a BAP routing identifier, a reserved value of a BAP address, or a reserved value of a BAP path identifier.

Aspect 6: The method of any of Aspects 3-5, wherein the indication is provided via a length field of the BAP header.

Aspect 7: The method of any of Aspects 1-6, further comprising transmitting an indication of a capability to support BAP routing based at least in part on extended routing information.

Aspect 8: The method of any of Aspects 1-7, wherein the wireless node is an IAB node.

Aspect 9: The method of any of Aspects 1-7, wherein the wireless node is a user equipment.

Aspect 10: A method of wireless communication performed by a wireless node, comprising: receiving a packet that includes extended routing information in a BAP header; and processing the packet based at least in part on the extended routing information in the BAP header.

Aspect 11: The method of Aspect 10, wherein the extended routing information includes an extension of at least one of a BAP routing identifier, a BAP address, or a BAP path identifier.

Aspect 12: The method of any of Aspects 10-11, wherein the BAP header includes an indication that the BAP header carries the extended routing information.

Aspect 13: The method of Aspect 12, wherein the indication is provided in a control bit of the BAP header or in a reserved bit of the BAP header.

Aspect 14: The method of any of Aspects 12-13, wherein the indication is provided via one or more reserved values in a header field of the BAP header, the one or more reserved values including at least one of a reserved value of a BAP routing identifier, a reserved value of a BAP address, or a reserved value of a BAP path identifier.

Aspect 15: The method of any of Aspects 12-14, wherein the indication is provided via a length field of the BAP header.

Aspect 16: The method of any of Aspects 10-15, further comprising transmitting an indication of a capability to support BAP routing based at least in part on extended routing information.

Aspect 17: The method of any of Aspects 10-17, wherein the wireless node is an IAB node.

Aspect 18: The method of any of Aspects 10-17, wherein the wireless node is a user equipment.

Aspect 19: An apparatus for wireless communication at a device, comprising a processor; memory coupled with the processor; and instructions stored in the memory and executable by the processor to cause the apparatus to perform the method of one or more of Aspects 1-9.

Aspect 20: A device for wireless communication, comprising a memory and one or more processors coupled to the memory, the one or more processors configured to perform the method of one or more of Aspects 1-9.

Aspect 21: An apparatus for wireless communication, comprising at least one means for performing the method of one or more of Aspects 1-9.

Aspect 22: A non-transitory computer-readable medium storing code for wireless communication, the code comprising instructions executable by a processor to perform the method of one or more of Aspects 1-9.

Aspect 23: A non-transitory computer-readable medium storing a set of instructions for wireless communication, the set of instructions comprising one or more instructions that, when executed by one or more processors of a device, cause the device to perform the method of one or more of Aspects 1-9.

Aspect 24: An apparatus for wireless communication at a device, comprising a processor; memory coupled with the processor; and instructions stored in the memory and executable by the processor to cause the apparatus to perform the method of one or more of Aspects 10-18.

Aspect 25: A device for wireless communication, comprising a memory and one or more processors coupled to the memory, the one or more processors configured to perform the method of one or more of Aspects 10-18.

Aspect 26: An apparatus for wireless communication, comprising at least one means for performing the method of one or more of Aspects 10-18.

Aspect 27: A non-transitory computer-readable medium storing code for wireless communication, the code comprising instructions executable by a processor to perform the method of one or more of Aspects 10-18.

Aspect 28: A non-transitory computer-readable medium storing a set of instructions for wireless communication, the set of instructions comprising one or more instructions that, when executed by one or more processors of a device, cause the device to perform the method of one or more of Aspects 10-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless node for wireless communication, comprising:
    a memory; and
    one or more processors, coupled to the memory, configured to:
        receive a configuration for including extended routing information in backhaul adaptation protocol (BAP) headers, the extended routing information comprising at least one of an extended destination field with a length of more than 10 bits or an extended path field with a length of more than 10 bits; and
        transmit a packet that includes the extended routing information in a BAP header based at least in part on the configuration.

2. The wireless node of claim 1, wherein the extended routing information includes an extension of at least one of a BAP routing identifier carried in at least one of the extended destination field or the extended path field, a BAP address carried in the extended destination field, or a BAP path identifier carried in the extended path field.

3. The wireless node of claim 1, wherein the BAP header includes an indication that the BAP header carries the extended routing information.

4. The wireless node of claim 3, wherein the indication is provided in a control bit of the BAP header or in a reserved bit of the BAP header.

5. The wireless node of claim 3, wherein the indication is provided via one or more reserved values in a header field of the BAP header, the one or more reserved values including at least one of a reserved value of a BAP routing identifier, a reserved value of a BAP address, or a reserved value of a BAP path identifier.

6. The wireless node of claim 3, wherein the indication is provided via a length field of the BAP header.

7. The wireless node of claim 1, wherein the one or more processors are further configured to transmit an indication of a capability to support BAP routing based at least in part on extended routing information.

8. The wireless node of claim 1, wherein the wireless node is an integrated access and backhaul (IAB) node.

9. The wireless node of claim 1, wherein the wireless node is a user equipment.

10. A wireless node for wireless communication, comprising:
    a memory; and
    one or more processors, coupled to the memory, configured to:
        receive a packet that includes extended routing information in a backhaul adaptation protocol (BAP) header, the extended routing information comprising at least one of an extended destination field with a length of more than 10 bits or an extended path field with a length of more than 10 bits; and
        process the packet based at least in part on the extended routing information in the BAP header.

11. The wireless node of claim 10, wherein the extended routing information includes an extension of at least one of a BAP routing identifier carried in at least one of the extended destination field or the extended path field, a BAP address carried in the extended destination field, or a BAP path identifier carried in the extended path field.

12. The wireless node of claim 10, wherein the BAP header includes an indication that the BAP header carries the extended routing information.

13. The wireless node of claim 12, wherein the indication is provided in a control bit of the BAP header or in a reserved bit of the BAP header.

14. The wireless node of claim 12, wherein the indication is provided via one or more reserved values in a header field of the BAP header, the one or more reserved values including at least one of a reserved value of a BAP routing identifier, a reserved value of a BAP address, or a reserved value of a BAP path identifier.

15. The wireless node of claim 12, wherein the indication is provided via a length field of the BAP header.

16. The wireless node of claim 10, wherein the one or more processors are further configured to transmit an indication of a capability to support BAP routing based at least in part on extended routing information.

17. The wireless node of claim 10, wherein the wireless node is an integrated access and backhaul (IAB) node.

18. The wireless node of claim 10, wherein the wireless node is a user equipment.

19. A method of wireless communication performed by a wireless node, comprising:
    receiving a configuration for including extended routing information in backhaul adaptation protocol (BAP) headers, the extended routing information comprising at least one of an extended destination field with a length of more than 10 bits or an extended path field with a length of more than 10 bits; and
    transmitting a packet that includes the extended routing information in a BAP header based at least in part on the configuration.

20. The method of claim 19, wherein the extended routing information includes an extension of at least one of a BAP routing identifier carried in at least one of the extended destination field or the extended path field, a BAP address carried in the extended destination field, or a BAP path identifier carried in the extended path field.

21. The method of claim 19, wherein the BAP header includes an indication that the BAP header carries the extended routing information.

22. The method of claim 21, wherein the indication is provided in a control bit of the BAP header or in a reserved bit of the BAP header.

23. The method of claim 21, wherein the indication is provided via one or more reserved values in a header field of the BAP header, the one or more reserved values including at least one of a reserved value of a BAP routing identifier, a reserved value of a BAP address, or a reserved value of a BAP path identifier.

24. The method of claim 21, wherein the indication is provided via a length field of the BAP header.

25. The method of claim 19, further comprising transmitting an indication of a capability to support BAP routing based at least in part on extended routing information.

26. A method of wireless communication performed by a wireless node, comprising:
   receiving a packet that includes extended routing information in a backhaul adaptation protocol (BAP) header, the extended routing information comprising at least one of an extended destination field with a length of more than 10 bits or an extended path field with a length of more than 10 bits; and
   processing the packet based at least in part on the extended routing information in the BAP header.

27. The method of claim 26, wherein the extended routing information includes an extension of at least one of a BAP routing identifier carried in at least one of the extended destination field or the extended path field, a BAP address carried in the extended destination field, or a BAP path identifier carried in the extended path field.

28. The method of claim 26, wherein the BAP header includes an indication that the BAP header carries the extended routing information.

29. The method of claim 28, wherein the indication is provided at least one of:
   in a control bit of the BAP header,
   in a reserved bit of the BAP header,
   via one or more reserved values in a header field of the BAP header, the one or more reserved values including at least one of a reserved value of a BAP routing identifier, a reserved value of a BAP address, or a reserved value of a BAP path identifier, or
   via a length field of the BAP header.

30. The method of claim 26, further comprising transmitting an indication of a capability to support BAP routing based at least in part on extended routing information.

* * * * *